United States Patent

[11] 3,622,911

[72] Inventor Enrique A. J. Marcatili
 Rumson, N.J.
[21] Appl. No. 780,395
[22] Filed Dec. 2, 1968
[45] Patented Nov. 23, 1971
[73] Assignee Bell Telephone Laboratories, Incorporated
 Murray Hill, Berkeley Heights, N.J.

[54] LASER OSCILLATOR WITH MODE SELECTOR
 2 Claims, 7 Drawing Figs.
[52] U.S. Cl............................................ 331/94.5,
 330/4.3, 250/199, 333/10, 350/96
[51] Int. Cl........................................... H01s 3/10
[50] Field of Search................................ 331/94.5;
 330/4.3; 250/199; 333/10; 350/96

[56] References Cited
 UNITED STATES PATENTS
3,414,840 12/1968 Di Domenico, Jr. et al.. 331/94.5
3,478,277 11/1969 Giordmaine et al. ........ 331/94.5
3,504,299 3/1970 Fox ............................ 331/94.5

OTHER REFERENCES
 Kupka, " Frequency Modulated Single Mode Laser," Electronics Letters, 4, (2), 26 Jan. 68 pp. 31–32.
 Kosonocky, " Very Low-Power Semiconductor Laser" RCA Tech. Notes, TN No. 781, September 25, 1968, 4 pp. (pp. 1–4).

Primary Examiner—Ronald L. Wibert
Assistant Examiner—R. J. Webster
Attorneys—R. J. Guenther and Arthur J. Torsiglieri ABSTRACT: This application describes a dual cavity, mode selective laser. The two cavities are formed with three mirrors, one of which is common to both the primary cavity, containing the active laser material, and the auxiliary cavity. The common mirror is located such that a power divider, positioned in a region of the laser common to both cavities, coupled the primary cavity mirrors together by virtue of the divider's reflective properties and couples the auxiliary cavity mirrors together by virtue of the divider's transmissive properties.

PATENTED NOV 23 1971          3,622,911

INVENTOR
E.A.J. MARCATILI
BY Lyman Sherman
ATTORNEY

LASER OSCILLATOR WITH MODE SELECTOR

This invention relates to mode selective resonant cavities for use with laser oscillators.

BACKGROUND OF THE INVENTION

In the copending applications by C. F. Edwards et al., Ser. No. 466,366, and by A. G. Fox, Ser. No. 466,365, both filed June 23, 1965 and assigned to applicant's assignee, cavity arrangements are described for limiting the number of longitudinal modes which can be sustained by a laser oscillator. In both of these applications, a third mirror and an intracavity beam splitter are added to the laser in a manner to form two coupled resonant cavities. The first, or primary cavity, which includes the active laser material, is capable of sustaining a plurality of longitudinal modes whose frequency separation is a function of the electrical length of the primary cavity. Similarly, the second, or auxiliary cavity is characterized by a plurality of resonances whose frequency separation is defined by the length of the auxiliary cavity. In operation, only those modes whose frequencies are common to both cavities are sustained.

In both of the above-identified applications, the mode selectivity is increased by increasing the reflectivity of the beam splitter. In practice, this is done by physically replacing the existing beam splitter with one having a different reflectivity. As such, the laser selectivity cannot be continuously varied. Similarly, in both of these arrangements, the auxiliary cavity, which is called upon to sustain high-intensity fields, is defined by two mirrors and the high-reflectivity beam splitter. The presence of the high-reflectivity beam splitter has the disadvantage of adding a third, lossy surface to the auxiliary cavity.

It is, accordingly, a first object of the present invention to provide a laser oscillator in which the mode selectivity is continuously variable.

It is a further object of the present invention to reduce the losses in a dual cavity, mode selective laser oscillator.

SUMMARY OF THE INVENTION

In accordance with the present invention, a mode selective laser oscillator comprises, as in the prior art, three mirrors and a beam splitter. As before, the mirrors are arranged to form a primary and auxiliary cavity coupled together by the beam splitter. There are, however, two very significant differences. In accordance with the present invention, the beam splitter is characterized by a very small coefficient of reflectivity and a correspondingly high coefficient of transmission. The second difference relates to the arrangement of mirrors. In the prior art, the mirrors forming the primary cavity are coupled by virtue of the transmission properties of the beam splitter. In accordance with the present invention, the primary cavity mirrors are coupled by virtue of the reflection properties of the beam splitter.

The resulting arrangement is characterized by two distinguishing features. Because the beam splitter is a very low reflectivity power divider, rather than a high-reflectivity divider, the auxiliary cavity has only two reflecting surfaces and, hence, the cavity losses are correspondingly reduced. The second difference resides in the fact that the selectivity of the auxiliary cavity response curve can be continuously varied by initially orienting the beam divider at or near the Brewster angle and then altering the transmission through the beam splitter by rotating the auxiliary cavity, including the beam splitter, about the primary cavity axis.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
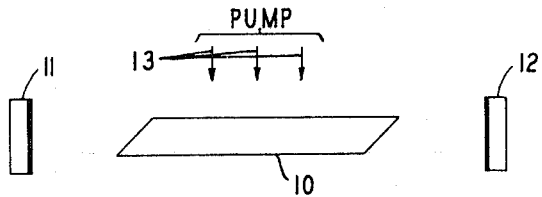
FIG. 1 shows a typical prior art laser.

Referring to the drawings, FIG. 1 shows a typical prior art laser structure comprising an element 10 of active laser material disposed within a cavity defined by a pair of mirrors 11 and 12. Means, represented by arrows 13, are provided for pumping the laser element in accordance with techniques well known in the art.

Figure 2:
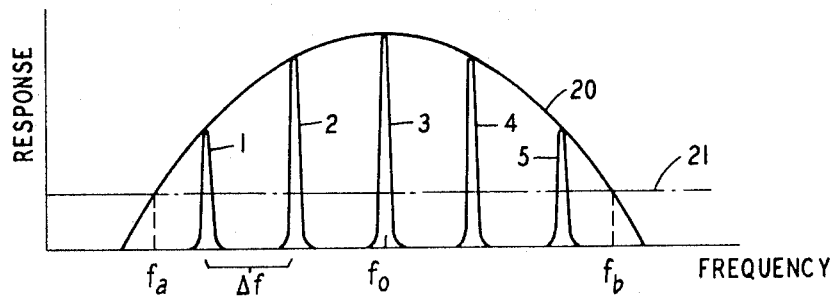
FIG. 2, included for purposes of explanation, shows the modal response of the laser of FIG. 1.

Because the laser cavity is very much larger than the wavelengths of the signals emitted by the active material, a laser oscillator is inherently a multimode device. That is, a laser oscillator is typically capable of simultaneously oscillating at a plurality of bands of frequencies whose nominal center-to-center spacing, $\Delta f$, is equal to $c/2L$, where $c$ is the velocity of light and $L$ is the effective cavity length. This condition is represented in FIG. 2 which shows the Doppler-broadened gain curve 20 for the laser, and the threshold level 21 at which the gain per pass for the laser exceeds the losses on the system due to useful loading, scattering losses, reflection losses, etc. In the absence of special measures to suppress them, a plurality of oscillatory modes 1-5, whose frequencies fall between $f_a$ and $f_b$, will be generated.

Figure 3:
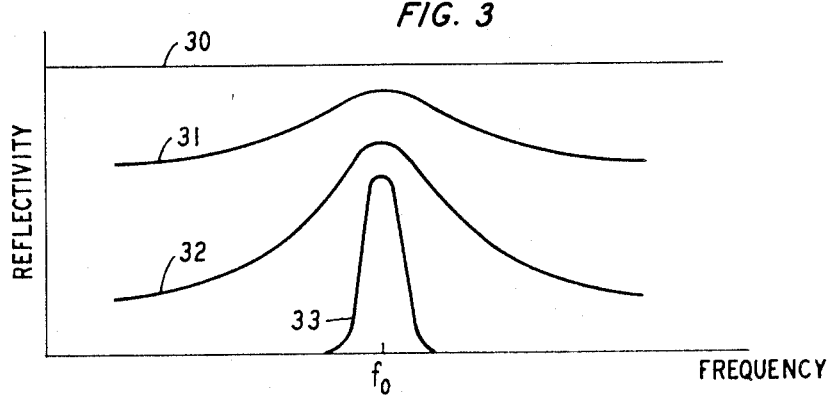
FIG. 3, included for purposes of explanation, shows a frequency-dependent reflectivity characteristic.

The above brief discussion of the modal characteristic of a typical laser oscillator presupposes that both mirrors 11 and 12 respond uniformly to all modes. If, on the other hand, the reflectivity of one of the mirrors is made frequency-dependent, it is apparent that the modal characteristic of the laser would be significantly modified. That this is so can be seen by referring to FIG. 3, which shows four different frequency-reflectivity response curves. The first of these curves 30 is uniformly high ($\approx 1$), and constant as a function of frequency. As such it reflects all the cavity modes uniformly and with little loss. A mirror characterized by curve 31, on the other hand, has a reflectivity which is highest at frequency $f_o$, and which decreases somewhat for frequencies above and below $f_o$. Thus, cavity modes 1, 2, 4, and 5 experience somewhat higher losses as a result of this, but may, nevertheless, continue to oscillate so long as the round trip net gain is greater than unity.

As the selectivity of the reflectivity response curve increases, however, a point is reached when the net round trip gain for selected modes decreases to such a level that oscillations cease. For example, with the selectivity shown by curve 32, modes 1 and 5 would tend to cease, while only mode 3 would continue to oscillate when the selectivity is as defined by curve 33.

Figure 4:
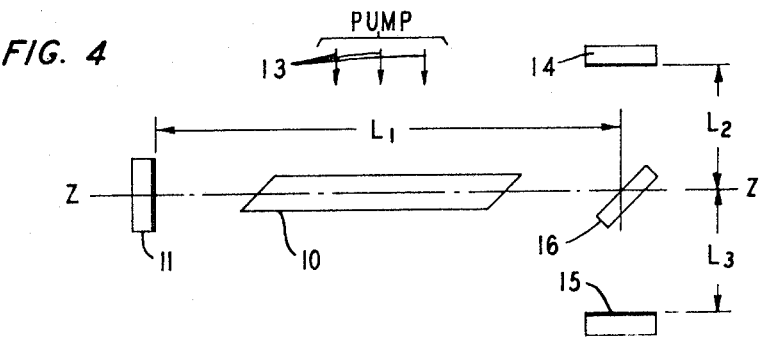
FIGS. 4, 5, 6, and 7 show various illustrative embodiments of mode-selective laser oscillators in accordance with the present invention.

In accordance with the present invention, the desired reflectivity response, as a function of frequency, is realized by the addition of an auxiliary cavity disposed in the manner shown in FIG. 4. In this embodiment, the primary laser cavity comprises mirrors 11 and 14, coupled together by means of a beam splitter power divider 16. A laser element 10, such as an elongated gas-filled or liquid-filled tube, is located within the portion of the primary cavity between mirror 11 and beam splitter 16. An auxiliary cavity is formed between primary cavity mirror 14 and a third mirror 15 located on the opposite side of beam splitter 16.

In addition to serving as a means of coupling wave energy between the primary cavity mirrors 11 and 14, beam splitter 16 is located at a region common to both cavities and serves to couple the cavities together. More particularly, beam splitter 16 is located at the end of laser element 10 opposite mirror 11. So located it intercepts the beam emitted by the active laser element and divides it into two signal components whose relative amplitudes are proportional to the coefficient of transmission and the coefficient of reflection, respectively, of the beam splitter. Since the signal component transmitted through the beam splitter is coupled out of both the primary and the auxiliary cavities, it would represent a substantial loss to the system. Accordingly, means must be provided for minimizing this loss if the laser is to operate. More particularly, this loss is selectively minimized so as to sustain oscillations at only one of the many possible modes of operation. This is accomplished by the presence of the auxiliary cavity whose mirrors 14 and 15 are located, respectively, on opposite sides of beam splitter 16. So disposed, the reflected signal component from beam splitter 16 is incident upon and reflected by mirror 14 back towards beam splitter 16 where it is again divided into two components. One component is transmitted through the beam splitter towards mirror 15. The other component is reflected back towards laser element 10.

That portion of wave energy trapped in the auxiliary cavity formed by mirrors 14 and 15 gradually builds up at the resonant frequency of the auxiliary cavity and ultimately provides a component which is reflected out of the auxiliary cavity by beam splitter 16 at the proper phase and with the proper amplitude to cancel the corresponding component of energy transmitted through the beam splitter.

Recognizing that the auxiliary cavity is also characterized by a plurality of cavity modes, it is evident that the laser can only oscillate at those frequencies that are common to both the primary cavity and the auxiliary cavity. Since the length $(L_2+L_3)$ of the auxiliary cavity can be made much smaller than the length $(L_1+L_2)$ of the primary cavity, the mode-to-mode spacing between the auxiliary cavity modes can be made sufficiently large so that only one auxiliary cavity mode is located within the Doppler-broadened gain curve for the laser. Hence, oscillations will be produced at only this one mode.

The mode selective laser illustrated in FIG. 4 is different than the laser arrangements described in the above-identified copending applications in a number of significant ways. The most obvious difference lies in the location of mirror 14 which is common to both cavities. In accordance with the present invention, mirror 14 is positioned so that it is coupled to mirror 11 of the primary cavity by virtue of the reflective properties of the beam splitter, and to mirror 15 of the auxiliary cavity by virtue of the transmissive properties of the beam splitter.

Arranged in the manner hereindescribed, reflectivity R of the auxiliary cavity is given by $$R = \frac{r_2(1-t^2)e^{i\varphi_3}}{1-r_2r_3t^2e^{i(\varphi_2+\varphi_3)}} \quad (1)$$

where $r_2$ and $r_3$ are coefficients of reflection of reflectors 14 and 15 respectively;

$\Phi_2=(4\pi L_2)/\lambda$;
$\Phi_3=(4\pi L_3)/\lambda$;

$\lambda$ is the signal wavelength; and $t$ is the coefficient of transmission of the beam splitter.

Assuming perfect mirrors ($r_2=r_3=-1$), the reflectivity R is unity at resonance, that is, when $L_2+L_3$ is equal to an integral multiple of $\lambda/2$.

The Q of the reflectivity characteristic, is given by $$Q = \frac{f_0}{2\Delta f} = \frac{t}{1-t^2} \cdot \frac{2\pi(L_2+L_3)}{\lambda_0}, \quad (2)$$

where $\Delta f$ is the frequency deviation from the resonant frequency, $f_0$, at which the reflected power is reduced by 50 percent ($R^2=0.5$).

As can be seen from equation (2), the reflectivity Q increases as the coefficient of transmission, $t$, of the beam splitter increases. Thus, whereas the beam splitters used in the above-identified copending applications were essentially mirrors, having very high reflectivities, beam splitter 16, advantageously, is a piece of glass having a very low reflectivity. This difference has two very important consequences. By using a low-reflectivity beam splitter, the losses associated with the beam splitter are correspondingly reduced and, hence, the overall laser losses are less. The second advantage lies in the fact that the selectivity of the reflectivity response curve is continuously variable. This can be realized by using a planar piece of glass, oriented such that the beam from the laser element is incident at or near the Brewster angle. So oriented, very little energy is reflected by the glass. If, however, this orientation is changed, so as to depart from the Brewster angle, the reflectivity increases. Accordingly, the selectivity can then be varied by simultaneously rotating the auxiliary cavity, including beam splitter 16 and mirrors 14 and 15, about the longitudinal axis Z—Z of the laser element, thereby continuously changing the reflectivity of the beam splitter.

Figure 5:
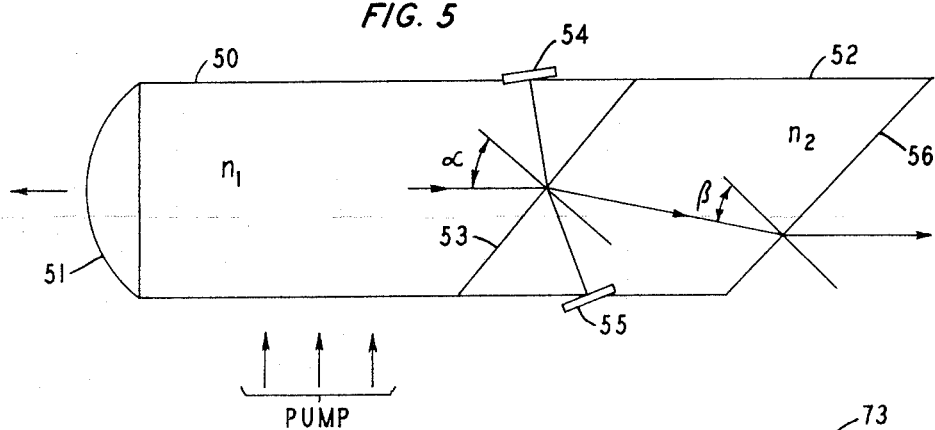
Figure 6:
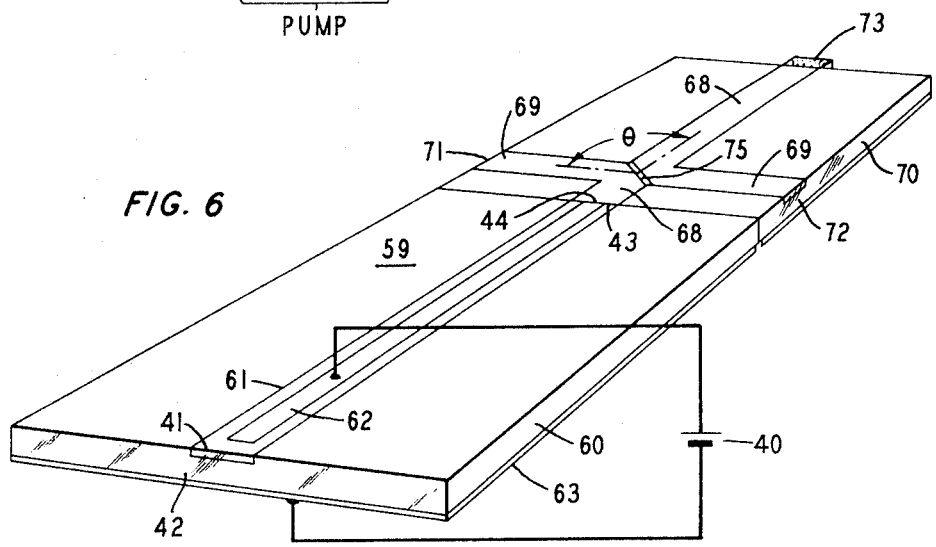
Figure 7:
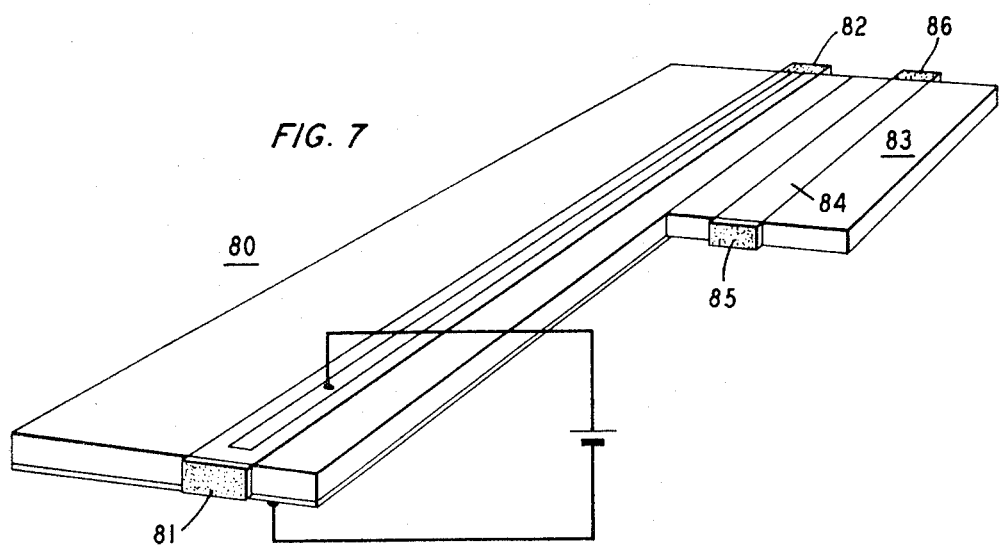

In the illustrative embodiment of FIG. 4, beam splitter 16 is shown as a discrete component, and the three mirrors 11, 14 and 15 are shown disposed about, and separated from the active laser element 10. FIGS. 5, 6 and 7, now to be described, illustrate a variety of alternative embodiments of the invention which take advantage of some of the unique features of the invention. For example, since the beam splitter has a very high transmissivity and very low reflectivity, the desired characteristics can be realized by the simple expedient of introducing a discontinuity in the optical wavepath. This expedient is illustrated in FIG. 5 wherein an element 50 of a solid laser material having a reflective index $n_1$ is bounded at one end by a partially transmissive mirror 51 and at the other end by an element 52 of a transparent material whose refractive index $n_2$ is different than $n_1$. By inclining the plane of the interface 53 between the two materials such that the angle of incidence $\alpha$ is slightly different than the Brewster angle, a small portion of the incident wave energy is reflected at the interface. Mirror 54, common to both the primary and auxiliary cavities is positioned on one side of element 50 so as to intercept and reflect primary cavity wave energy. Auxiliary cavity mirror 55 is located on the side of element 52 opposite mirror 54.

In order to preclude the possibility of any spurious reflectivity peaks, the outside surface 56 of element 52 is inclined at the Brewster angle $\beta$. Alternatively, surface 56 can be coated with an absorbing material.

It will be noted that in the embodiment of FIG. 5, all the mirrors 51, 54 and 55 are mounted directly upon the active element 50, or upon element 52, and that there is no separate beam splitter. Instead, the latter is formed at the interface between elements 50 and 52.

In the embodiment of FIG. 6, the laser is a diode injection laser, advantageously of the "stripe" variety described in U.S. Pat. No. 3,363,195 wherein the active region is in the shape of a long, narrow rectangle or stripe. Thus, in FIG. 6, the diode 59 comprises a semiconducting crystal 60, the bulk of which is of one conductivity type, such as, for example, N-type GaAs, and which includes a localized P-type region 61, forming a PN junction therebetween. Separate ohmic contact is made to each region by means of metallic electrodes 62 and 63. A source of current 40 forward biases the diode beyond the threshold bias required to produce lasing.

One end 41 of diode 59 is cleaved or polished to provide a mirrorlike-reflecting surface 42. The opposite end 43 of diode 59 is coupled to one end 55 of a colinearly aligned section of transmission line 68. The other end of line 68 is advantageously terminated by means of a power absorber 73, by an antireflective coating, or can be cut at the Brewster angle so as to avoid spurious resonances. A second section of transmission line 69, comprising the auxiliary cavity, intersects line 68 at an arbitrary angle $\theta$. Mirrorlike reflecting surfaces 71 and 72 are formed at the respective ends of line 69 by cleaving or polishing the end surfaces, or by other means well known in the art.

The two transmission line sections 68 and 69 are advantageously of the type described in my copending application Ser. No. 730,192, filed May 17, 1968 and assigned to applicant's assignee. As described in said copending application, each transmission line section comprises a transparent (low-loss) dielectric strip embedded in a second transparent dielectric substrate of slightly lower refractive index.

Coupling between diode 59 and the auxiliary cavity is effected by means of a transmission discontinuity 75 which extends transversely across the region of intersection of lines 68 and 69. By orienting the discontinuity so that it bisects the angle of intersection $\theta$ between the line sections, energy reflected at the discontinuity is directed along line 69. In particular, when aligned in the manner shown, the primary cavity is formed between reflecting surfaces 42 and 71. If, on the other hand, the discontinuity extended across the region of intersection at 90° to the indicated direction, the primary cavity would be formed between surfaces 42 and 72. The ratio of the energy transmitted to the energy reflected by discontinuity 75 will, of course, depend upon the size of the discontinuity being smaller as its depth and length is increased.

The final structure shown in FIG. 7, is an alternative arrangement of the injection laser embodiment of FIG. 6. In FIG. 7, the diode injection laser is a continuous strip, terminated at one end by a mirror 81 and at the other end by an absorber or by an antireflective coating 82. The auxiliary cavity 83 comprises a section of dielectric transmission line 84 which extends alongside, forming a directional coupler with a portion of diode 80. Opposite ends of the line section 84 are terminated by mirrors 85 and 86.

In this embodiment of the invention coupling between the primary and auxiliary cavities is effectuated by virtue of the physical proximity of diode 80 and line section 83.

It is understood that in each of the above-described embodiments at least one of the mirrors is partially transmissive so that energy can be coupled out of the laser.

SUMMARY

The above-described embodiments are illustrative of but a few of the many possible specific arrangements which can be devised in accordance with the principles of the present invention. As shown, the invention can be practiced with gaseous or liquid laser materials, as in FIG. 1; solid laser materials, as in FIG. 5; and diode injection lasers, as in FIGS. 6 and 7. The laser material can either be confined solely to a portion of the primary cavity, as in FIGS. 4, 6 and 7, or can extend into that portion of the primary cavity shared in common with the auxiliary cavity. The beam splitting means can be a separate element, as in FIG. 4, or can be formed by means of a discontinuity in the laser beam wavepath, as in FIGS. 5, 6 and 7. While it is contemplated that the beam splitter will typically have a relatively high coefficient of transmission, of the order of 90 percent and higher, it will be recognized that lower coefficients of transmission can be used where less selectivity is required. Obviously, the various features of each of the illustrative embodiments can be utilized to form other arrangements in accordance with these principles by those skilled in the art without departing from the spirit and scope of the invention.

I claim:

1. A dual cavity, frequency selective laser oscillator having:
   first and second resonant cavities supportive of two different pluralities of resonant frequencies having only one frequency common to both within the band of interest;
   said cavities comprising:
      a low-loss dielectric substrate;
      a pair of nonintersecting low-loss dielectric strips of higher refractive index than said substrate, embedded therein;
   characterized in that:
      said strips are unequal in length, with the shorter of said strips being in coupling relationship with the longer of said strips along a portion thereof adjacent to one end of said longer strip;
      said shorter strip is terminated at both ends by means of reflective members;
      said longer strip is terminated at said one end by lossy means and at the other end by a reflecting member;
      and in that substantially the entire length of said longer strip is an active laser material.

2. The oscillator according to claim 1 wherein said active laser material is an injection diode.

* * * * *